(12) United States Patent
Sajadieh et al.

(10) Patent No.: US 9,420,634 B2
(45) Date of Patent: Aug. 16, 2016

(54) USER EQUIPMENT HAVING VIRTUAL MOBILE TERMINALS

(75) Inventors: Masoud Sajadieh, Fremont, CA (US);
Xue Yang, Arcadia, CA (US); Praveen Gopalakrishnan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 68 days.

(21) Appl. No.: 13/995,915

(22) PCT Filed: Dec. 9, 2011

(86) PCT No.: PCT/US2011/064188
§ 371 (c)(1),
(2), (4) Date: Jun. 19, 2013

(87) PCT Pub. No.: WO2013/085541
PCT Pub. Date: Jun. 13, 2013

(65) Prior Publication Data
US 2013/0288741 A1 Oct. 31, 2013

(51) Int. Cl.
| | | |
|---|---|---|
| H04M 1/00 | (2006.01) | |
| H04W 88/06 | (2009.01) | |
| H04W 76/02 | (2009.01) | |
| H04W 8/18 | (2009.01) | |

(52) U.S. Cl.
CPC ............ H04W 88/06 (2013.01); H04W 76/025 (2013.01); H04W 8/18 (2013.01)

(58) Field of Classification Search
None
See application file for complete search history.

(56) References Cited

U.S. PATENT DOCUMENTS

| | | | |
|---|---|---|---|
| 8,392,625 B2 | 3/2013 | Gopalakrishnan et al. | |
| 2004/0192222 A1 | 9/2004 | Vaisanen et al. | |
| 2004/0209618 A1 | 10/2004 | Niemela et al. | |
| 2010/0279698 A1 | 11/2010 | Wong | |
| 2011/0216775 A1 | 9/2011 | Gargett | |
| 2011/0269456 A1* | 11/2011 | Krishnaswamy et al. | . 455/426.1 |
| 2011/0321042 A1 | 12/2011 | Yang et al. | |
| 2012/0033610 A1* | 2/2012 | Ring et al. | ............ 370/328 |
| 2012/0108294 A1* | 5/2012 | Kaul | ........ G06K 7/0013 455/558 |
| 2012/0315882 A1* | 12/2012 | Chang | ....... H04M 1/72522 455/414.1 |
| 2013/0023235 A1* | 1/2013 | Fan | ............ H04W 48/18 455/411 |

FOREIGN PATENT DOCUMENTS

GB 2381418 A 4/2003

OTHER PUBLICATIONS

International Search Report and Written Opinion mailed Aug. 31, 2012 from International Application No. PCT/US2011/064188.
International Preliminary Report on Patentability mailed Jun. 19, 2014 from International Application No. PCT/US2011/064188.
Extended European Search Report issued Dec. 9, 2015 from European Patent Application No. 11877002.3, 6 pages.

* cited by examiner

*Primary Examiner* — Suhail Khan
(74) *Attorney, Agent, or Firm* — Schwabe, Williamson & Wyatt, P.C.

(57) ABSTRACT

Embodiments of the present disclosure describe methods, apparatuses, and systems related to a user equipment having virtual mobile terminals. Other embodiments may be described and/or claimed.

8 Claims, 11 Drawing Sheets

USER EQUIPMENT HAVING VIRTUAL MOBILE TERMINALS

CROSS REFERENCE TO RELATED APPLICATIONS

The present application is a national phase entry under 35 U.S.C. §371 of International Application No. PCT/US2011/064188, filed Dec. 9, 2011, entitled "USER EQUIPMENT HAVING VIRTUAL MOBILE TERMINALS", which designates the United States of America. The entire content and disclosure of which is hereby incorporated by reference in its entirety.

FIELD

Embodiments of the present disclosure generally relate to the field of wireless communication systems, and more particularly, to a user equipment having virtual mobile terminals.

BACKGROUND

Increasing popularity of using personally-owned devices in the workplace creates multiple technical challenges. The bring-your-own-device (BYOD) paradigm shift burdens information technology (IT) organizations to protect enterprise information security and to defend against attacks and malware on devices and software not owned and certified by the IT organization.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
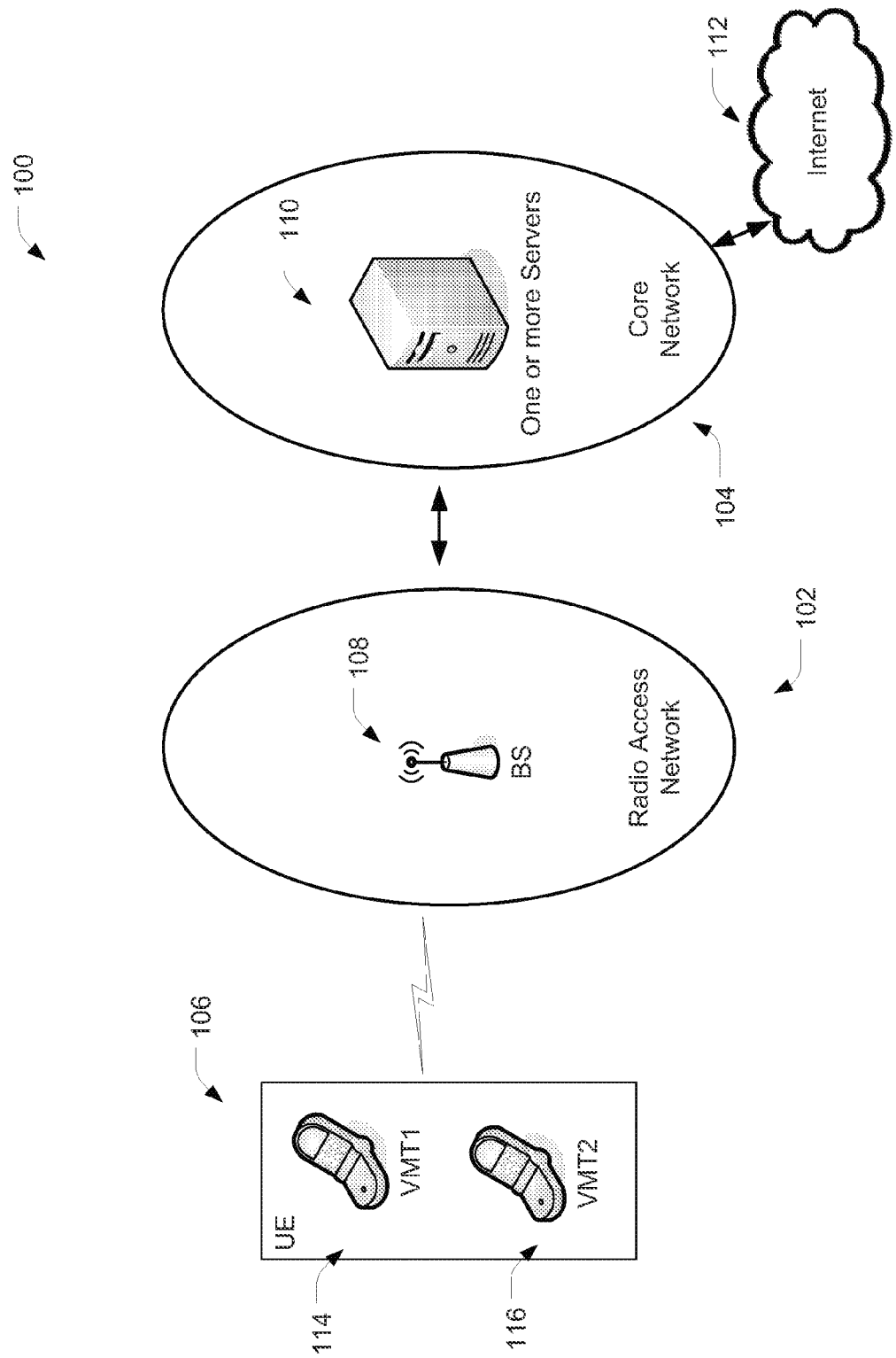
FIG. 1 illustrates a broadband wireless access network in accordance with some embodiments.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "component" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Various embodiments describe a user equipment comprising a radio transceiver configured to communicatively couple the user equipment to a radio access network; a first virtual mobile terminal to establish a first connection with the radio access network via the radio transceiver; and a second virtual mobile terminal to establish a second connection with the radio access network via the radio transceiver. The first connection may be concurrent with the second connection.

The first virtual mobile terminal may establish the first connection with a first set of profiles including a first subscription profile, a first quality of service (QoS) profile, and a first billing profile; while the second virtual mobile terminal establishes the second connection with a second set of profiles including a second subscription profile, a second QoS profile, and a second billing profile.

The user equipment may have a mobile terminal and terminal equipment. The mobile terminal may have one or more mobile terminal processors to provide the first and second virtual mobile terminals. The terminal equipment may have one or more terminal equipment processors to provide a first virtual machine and a second virtual machine. The first virtual machine may be communicatively coupled with the first virtual mobile terminal and the second virtual machine may be communicatively coupled with the second virtual mobile terminal.

In some embodiments, the first virtual mobile terminal may be configured to use a first communication protocol stack including layer 2 and higher protocol layers; the second virtual mobile terminal may be configured to use a second communication protocol stack including layer 2 and higher protocol layers; and both the first virtual mobile and the second virtual mobile terminal are configured to use a common physical layer.

In some embodiments, the user equipment may include a first universal subscriber identity module associated with the first virtual mobile terminal; and a second universal subscriber identity module associated with the second virtual mobile terminal.

In some embodiments, the first virtual mobile terminal and the second virtual mobile terminal may be configured to use a common communication protocol stack. A universal subscriber identity module may be associated with both the first virtual mobile terminal and the second virtual mobile terminal and the first connection may include a first set of one or more service data flows and the second connection may include a second set of one or more service data flows. The first set of one or more service data flows may be mapped to a first evolved packet system (EPS) bearer that is associated with the first virtual mobile terminal and the second set of one or more service data flows may be mapped to a second EPS bearer that is associated with the second virtual mobile terminal. A radio virtualization module may be configured to establish and manage a logical mapping between the first set of one or more service data flows and the first EPS bearer and the second set of one or more service data flows and the second EPS bearer.

In various embodiments, the first connection and the second connection are to be simultaneously activated or activated in a time-division multiplexing activation sequence.

Some disclosed embodiments describe one or more non-transitory computer readable media having instructions that, when executed, cause a user equipment to perform various operations. These operations may include controlling, by a first virtual mobile terminal, a radio transceiver of the user equipment in a manner to provide a first radio persona; and controlling, by a second virtual mobile terminal, the radio transceiver of the user equipment in a manner to provide a second radio persona concurrent with provision of the first radio persona.

The operations may include communicating data by a first connection associated with the first radio persona; and communicating data by a second connection associated with the second radio persona simultaneously with communication of data by the first connection.

The operations may include activating first and second connections, respectively associated with the first and second radio personas, according to a time division multiplexing activation sequence.

The operations may include associating, with the first radio persona, a first set of profiles including a first subscription profile, a first quality of service (QoS) profile, and a first billing profile; and associating, with the second radio persona, a second set of profiles including a second subscription profile, a second QoS profile, and a second billing profile.

The operations may include associating both the first and second personas with a universal mobile subscriber identity module that includes an international mobile subscriber indicator.

The operations may include associating the first radio persona with a first universal mobile subscriber identity module that includes a first international mobile subscriber indicator; and associating the second radio persona with a second universal mobile subscriber identity module that includes a second international mobile subscriber indicator.

In various embodiments, a mobile communication system is described. The system may include a radio transceiver configured to communicatively couple the system to a radio access network; one or more storage media having logic stored therein; one or more processors to operate the logic to provide: a first virtual mobile terminal to control the radio transceiver to communicate data with the radio access network via a first connection; and a second virtual mobile terminal to control the radio transceiver communicate data with the radio access network via a second connection, wherein the first connection and the second connection are to have concurrent Internet protocol (IP) connectivity with the radio access network.

The first connection may be associated with a first set of profiles including a first subscription profile, a first quality of service (QoS) profile, and a first billing profile; and the second connection may be associated with a second set of profiles including a second subscription profile, a second QoS profile, and a second billing profile.

The system may include a user interface including a display and a microphone; and a camera.

FIG. 1 illustrates an example broadband wireless access (BWA) network 100 in accordance with some embodiments. The BWA network 100 may include a radio access network (RAN) 102 and a core network 104. The RAN 102 and/or core network 104 may be Internet protocol (IP) based networks.

A user equipment (UE) 106 may access the core network 104 via a radio link ("link") with a base station (BS) 108 in the RAN 102. The core network 104 may have one or more servers 110 to communicatively couple the RAN 102 with a wider network, e.g., the Internet 112. In some embodiments, the RAN 102 and the core network 104 may be provided by a single mobile network operator (MNO).

The UE 106 may include a first virtual mobile terminal (VMT1) 114 and a second virtual mobile terminal (VMT2) 116. The VMT1 114 and VMT2 116 may be able to establish and maintain concurrent connections with the RAN 102. As used herein, concurrent connections are connections that at least partially overlap with one another. Connections need not share a start and/or end time to be concurrent.

A connection may exist when an entity, e.g., the VMT1 114 or VMT2 116, is authenticated by the network and is provided IP connectivity with the RAN 102. An existing connection may be active when the entity is actively communicating (e.g., transmitting or receiving) data with the RAN 102. Each connection may be associated with a respective set of profiles including, e.g., a subscription profile, a quality of service (QoS) profile, and a billing profile. In this manner, a mobile terminal of the UE 106 may appear to the RAN 102 and the servers of the core network 104, as two (or more) VMTs, i.e., VMT1 114 and VMT2 116, with each of the VMTs being separately managed. Therefore, each VMT may provide the UE 106 with a different radio persona. In some embodiments, this may include a personal persona and a corporate persona.

Separate management of the VMT1 114 and VMT2 116 may enable, e.g., in a bring-your-own-device (BYOD) paradigm, the ability to provide strong separation between the two radio personalities. This may provide an information technology (IT) department desired and differentiable control over the two radio personalities, e.g., separation in data, applications, system configurations/managements, network connections, etc. Embodiments described herein will discuss how virtualization of these mobile terminals is achieved.

The BWA network 100 is shown with certain components to facilitate discussion on the inventive concepts of the present disclosure. However, it will be understood that the BWA network 100 may include a large number of other components such as, but not limited to, gateways, servers, agents, modules, etc.

Components of the BWA network 100 may operate in conformance with the 3$^{rd}$ Generation Partnership Project (3GPP) long-term evolution (LTE) project along with any amendments, updates, and/or revisions (e.g., LTE-Advanced (LTE-A), ultra mobile broadband (UMB) project (also referred to as "3GPP2"), etc.). The BWA network 100 may be referred to as an Evolved Universal Mobile Telecommunications Systems (UMTS) Terrestrial Radio Access Network (e-UTRAN) when configured to operate in conformance with 3GPP LTE. In these embodiments, the base station 108 may also be referred to as an enhanced node base station (eNB). In other embodiments, components described herein may be compatible with additional/alternative communication standards, specifications, and/or protocols.

Figure 2:
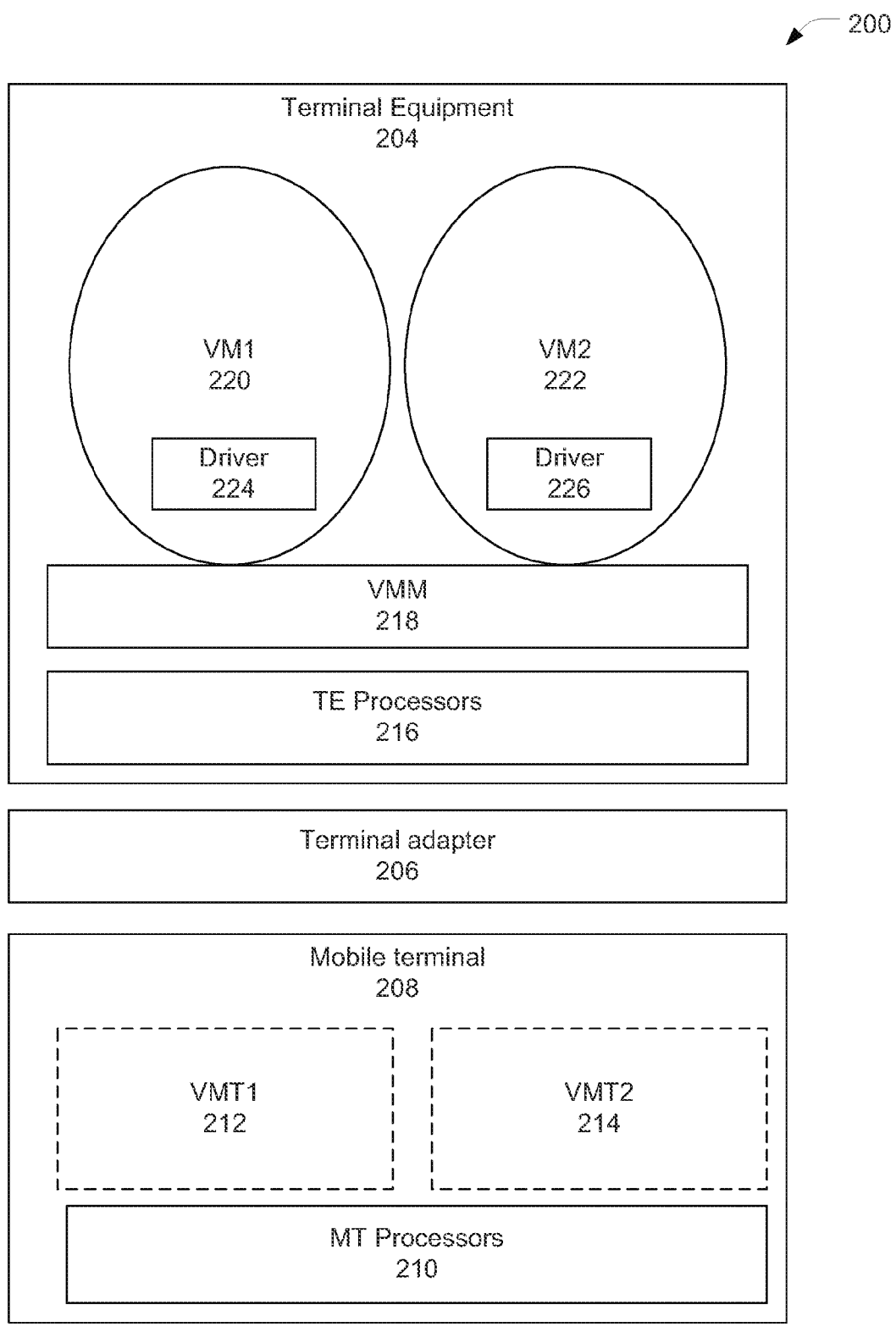
FIG. 2 illustrates a user equipment in accordance with some embodiments.

FIG. 2 illustrates a UE 200 in accordance with some embodiments. The UE 200 may be similar to, and substantially interchangeable with UE 106.

The UE 200 may include terminal equipment 204, a terminal adapter 206, and a mobile terminal 208. The terminal equipment 204 may, in general, be used to provide user services/functionality and, with respect to communications with a network, e.g., RAN 102, provide layer 3 (e.g., IP layer) and higher functions. The mobile terminal 208 may, in general, be used to provide layer 3 (e.g., RRC and NAS layers) and lower functions in order to connect with the network, e.g., RAN 102. The terminal adapter 206 may, in general, be used as an interface between the terminal equipment 204 and the mobile terminal 208. In some embodiments the terminal adapter 206 may include a bus over which attention (AT) commands are transmitted.

The mobile terminal 208 may include one or more MT processors 210, e.g., a radio transceiver, a baseband processor, etc., that connect to the RAN 102 by providing various mobile termination functions. The MT processor(s) 210 may provide a VMT1 212 and a VMT2 214, which each VMT capable of establishing and maintaining its own connection. While two separate radio transceivers would be needed to handle two independent radio personas having concurrent connections, the MT processors 210 may take advantage of the orthogonal resource allocation in both downlink and uplink in a physical layer of LTE, for example, so that a single radio transceiver can be shared between the two radio personas. Various sharing schemes will be described in further detail below.

The terminal equipment 204 may include one or more TE processors 216, e.g., a central processing unit, an application processor, etc., that provide the processing resources of the terminal equipment 204. The TE processors 216 may provide a virtual machine manager (VMM) 218, a first virtual machine (VM1) 220, and a second virtual machine (VM2) 222. The VMs may be segregated and independent execution environments for applications and operating systems within the UE 200, and the VMM 216 may arbitrate VM access to various resources of the terminal equipment 204. The arbitration of VM access to the resources of the terminal equipment 204 may be transparent to the VMs, with the VMs having the perspective that the resources are dedicated resources.

In some embodiments, the different VMs may operate applications and operating systems that correspond with the different VMTs. For example, VM1 220 may include a driver 224 that is communicatively coupled with VMT1 212 in order to communicate information over the connection maintained by VMT1 212. Similarly, VM2 222 may include a driver 226 that is communicatively coupled with VMT2 214 in order to communicate information over the connection maintained by VMT2 214. In this manner, in the BYOD paradigm introduced above, the corporate/personal personas may, in addition to having their own radio personas, may have their own execution environments on the UE 200.

Figure 3:
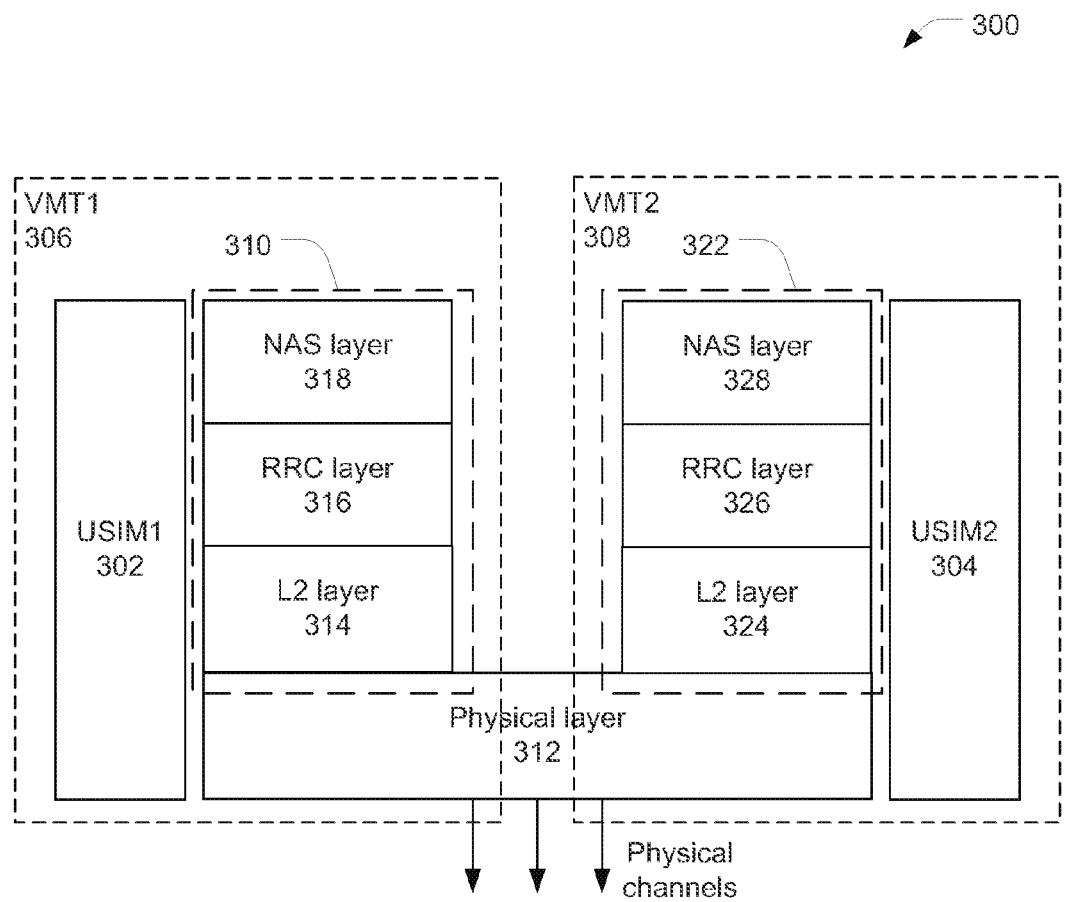
FIG. 3 illustrates a dual subscriber identity module, dual active (DSDA) architecture in accordance with some embodiments.

FIG. 3 illustrates a high-level terminal architecture 300 of a UE, e.g., UE 200, in accordance with some embodiments. The terminal architecture 300 may provide two independent and simultaneously active connections. The terminal architecture 300 may be referred to as a dual-subscriber identity module (SIM), dual-active (DSDA) architecture 300.

The DSDA architecture 300 may use two universal subscriber identity modules (USIM), e.g., USIM1 302 and USIM2 304, respectively associated with connections of VMT1 306 and VMT2 308, to provide the two radio personas. A USIM contains a unique number for a mobile subscriber, e.g., international mobile subscriber indicator (IMSI), which is associated with security authentication and ciphering information, user profile, the list of provisioned networks, services to which the user has access, etc. With each active connection associated with a different USIM, the network, e.g., the RAN 102 and/or core network 104, may not be aware that the two connections are from the same physical device. It may be noted that both USIM1 302 and USIM2 304 are USIMs of the same MNO and are used to fully differentiate the two radio persona on the same network.

The VMT1 306 may implement a communication protocol stack that includes a layer 2 (L2) protocol stack 310 and a physical layer 312, which may also be referred to a layer 1 (L1) layer 312. The L2 protocol stack 310 may include layer 2 and higher protocol layers, e.g., L2 layer 314, a radio resource control (RRC) layer 316, and a non-access stratum (NAS) layer 318. Briefly, the L2 layer 314 may include a media access control sublayer to, e.g., map logical channels to physical channels of the physical layer 312, provide hybrid automatic repeat request (HARQ) error correction and/or provide various scheduling functions; a radio link control sublayer to, e.g., provide automatic repeat request (ARQ) error correction, order/segment/concatenate protocol data units (PDUs), etc.; and a packet data convergence control (PDCP) sublayer to, e.g., transport data from the RRC layer 316 with ciphering and integrity protection. The RRC layer 316 may transport NAS messages, perform various management operations related to paging, RRC connection, security keys, handover, MT measurements related to mobility and QoS, etc. The NAS layer 318 may provide mobility support of the MT and support session management procedures to establish and maintain IP connectivity between the MT and network component, e.g., a packet data network gateway (PDN-GW) that may be in the core network 104. These layers/sublayers may provide additional/alternative functions in some embodiments. Further, other layers/sublayers may be included in the L2 protocol stack 310 though not specifically described.

The physical layer 312 may transport information between transport channels of the L2 layer and physical channels. The physical layer 312 may provide functions such as, but not limited to, link adaptation, power control, cell discovery, measurements for the RRC layer 316, etc.

The VMT2 308 may implement a communication protocol stack that includes an L2 protocol stack 322 and the physical layer 312. The L2 protocol stack 322 may include layer 2 and higher protocol layers, e.g., L2 layer 324, RRC layer 326, and NAS layer 328. The L2 protocol stack 322 may operate similar to L2 protocol stack 310.

The concurrency between the two radio persona may be enabled by the VMTs sharing the physical layer 312 but running respective instances of the L2 protocol stacks, which may result from dedicated software threads in each of the VMTs.

Separation of data channels and bearers may occur at the top of L2 layers 314 and 324, while merging of the data channels and bearers may occur at bottom of the L2 layers 314 and 324. Given the dedicated instances of the L2 protocol stack coupled with the orthogonal resource allocation of the physical channels, the connection of VMT1 306 and VMT2 308 may be simultaneously active, e.g., transmitting and/or receiving data at the same time. Simultaneously activated connections of DSDA architecture 300 may be seen in transmission sequences 400 illustrated in FIG. 4. Specifically, DSDA transmission sequence 402 illustrates that VMT2 data (VMT2-D) 404, associated with USIM2 304, may be transmitted and/or received simultaneously with VMT1 data (VMT1-D) 406, associated with USIM1 302.

In some embodiments, in order to manage radio procedures of both radio persona, a combined RRC layer may be provided with state machines that are supersets of state machines of the RRC layer 316 and RRC layer 326.

Figure 5:
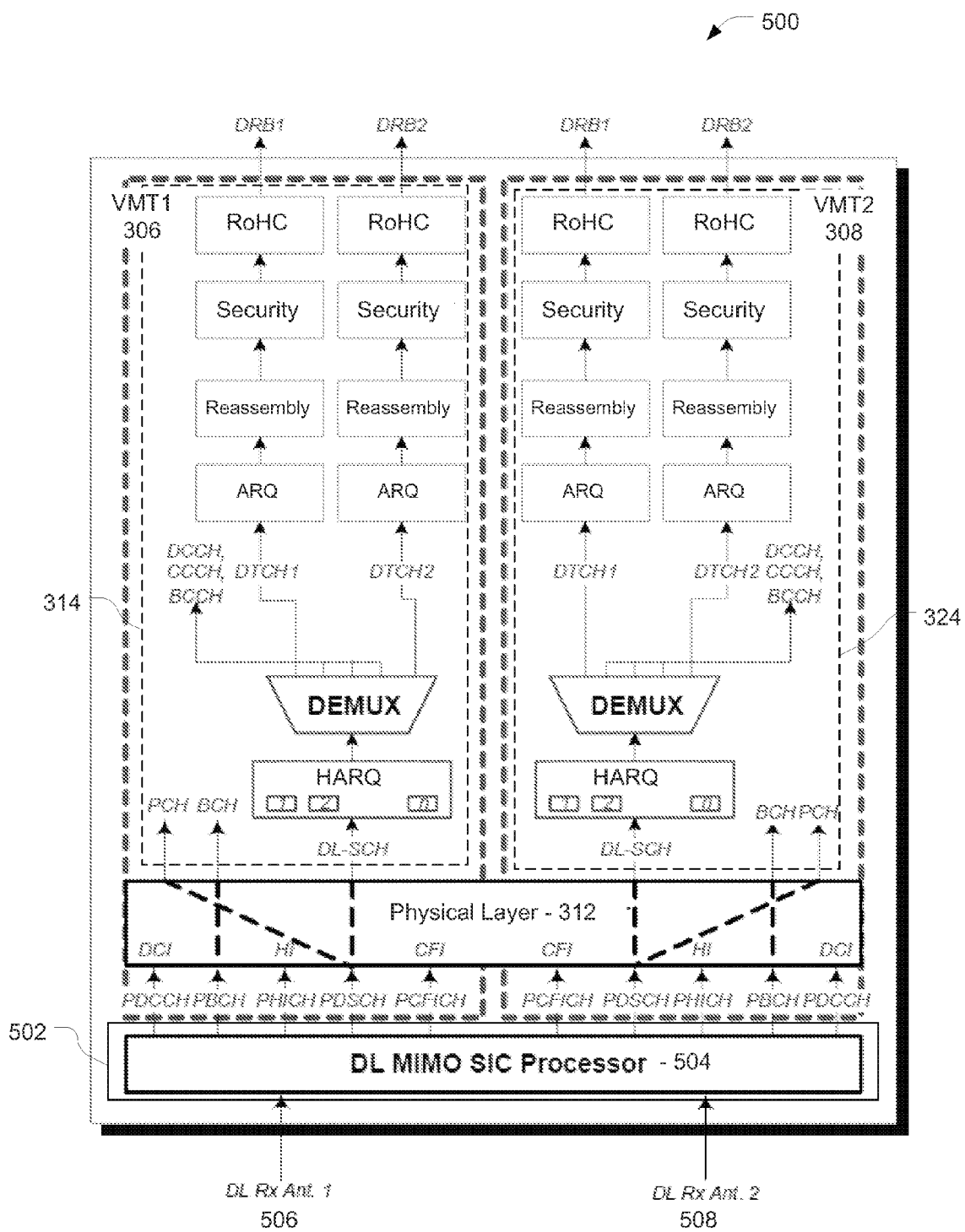
FIG. 5 illustrates a user data plane of a DSDA architecture in accordance with some embodiments.

FIG. 5 illustrates a user data plane 500 of DSDA architecture 300 in accordance with some embodiments. A radio transceiver 502, which may be similar to and substantially interchangeable with radio transceiver of MT processors 210, may include a downlink (DL) multiple input, multiple output (MIMO) successive interference cancellation (SIC) processor 504 that is coupled with a first DL receive antenna, DL Rx Ant. 1 506, and a second DL receive antenna, DL Rx Ant. 2 508.

The DL MIMO SIC processor 504 may provide first and second sets of data channels to the physical layer 312. Each set of channels may include a physical control channel (PDCCH) to provide downlink control information (DCI) to the physical layer 312, a physical broadcast channel (PBCH) mapped to a broadcast channel (BCH) of respective L2 layer, a physical HARQ indicator channel (PHICH) to provide a HARQ indicator (HI) to the physical layer 312, a physical downlink shared channel (PDSCH) mapped to a physical channel (PCH) and a DL shared channel (SCH) of respective L2 layer, and/or a physical control format indicator channel (PCFICH) to provide a control frame indicator (CFI) to the physical layer 312.

Each of L2 layer 314 and 324 may include a number of modules to provide various L2 functions and a number of channels through which data may be transported. For example, the DL-SCH may be provided to a HARQ module, which provides data to a demultiplexer (DEMUX). The DEMUX may output control information along dedicated control channel (DCCH), common control channel (CCCH), and/or broadcast control BCCH, and may output data traffic along parallel dedicated traffic channels (DTCHs), e.g., DTCH1 and DTCH2.

The DTCHs may be coupled through ARQ, reassembly, security, and RoHC modules for further L2 processing of data prior to being provided to an upper layer, e.g., an IP Layer, along data radio bearers (DRBs), e.g., DRB1 and DRB2.

Figure 6:
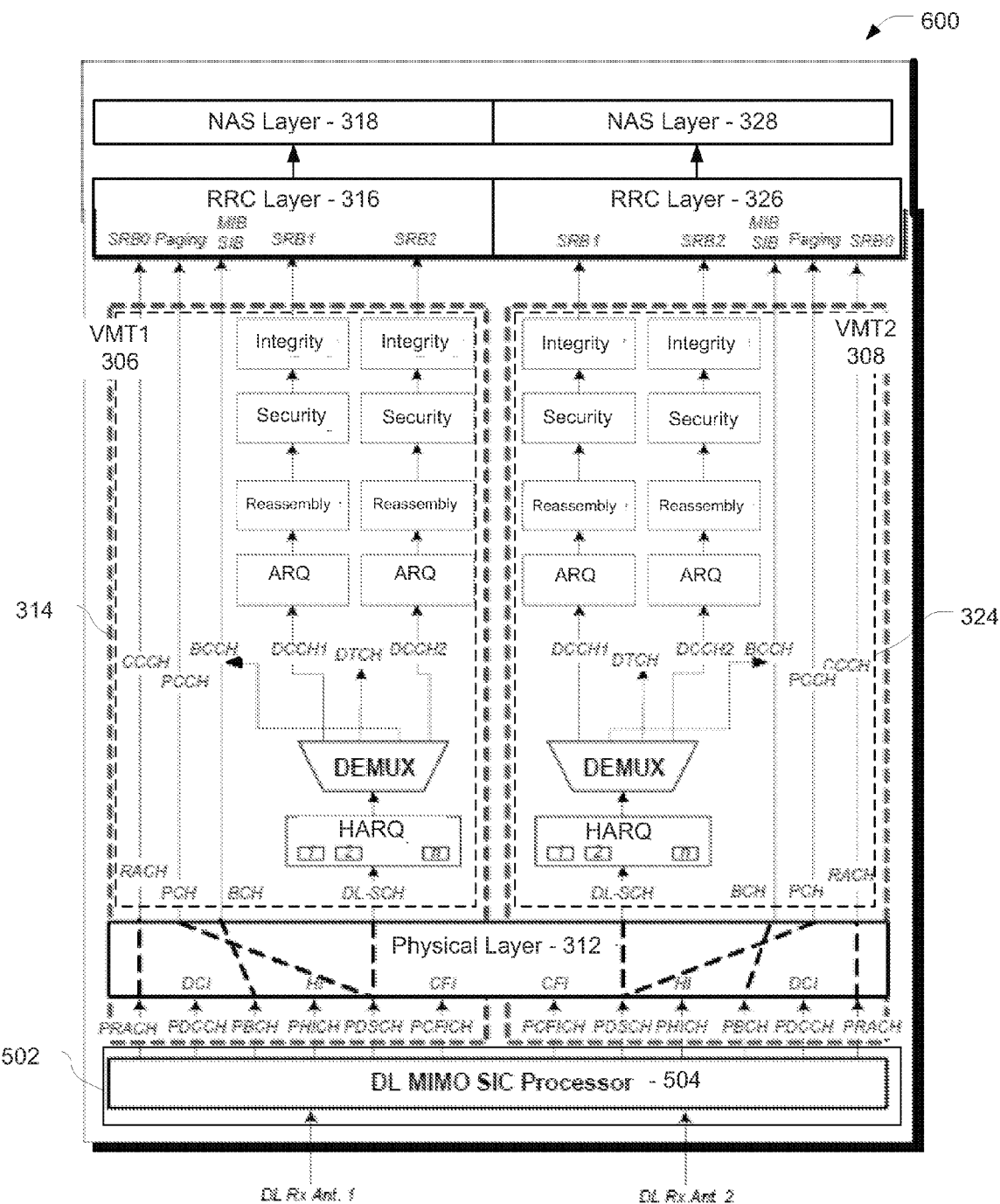
FIG. 6 illustrates a control plane of a DSDA architecture in accordance with some embodiments.

FIG. 6 illustrates a control plane 600 of DSDA architecture 300 in accordance with some embodiments. As in discussion of FIG. 5, the DL MIMO SIC processor 504 may be coupled with DL Rx Ant. 1 506 and DL Rx Ant. 2 508.

The DL MIMO SIC processor 504 may provide first and second sets of control channels to the physical layer 312. Each set of channels may include a physical random access channel (PRACH) mapped to a random access channel (RACH)/CCCH of respective L2 layer, PDCCH to provide DCI to the physical layer 312, PBCH mapped to a BCH of respective L2 layer, PHICH to provide HI to the physical layer 312, PDSCH mapped to a PCH and DL-SCH of respective L2 layer, and/or PCFICH to provide a CFI to the physical layer 312.

Information on the CCCH, PCCH, and BCCH may generally pass through the L2 layers and be provided to RRC layers 316 or 326, on signaling radio bearer 0 (SRB0), Paging, and master information block (MIB)/system information block (SIB). The information on the DL-SCH may be provided to a HARQ module, which provides data to the DEMUX. The DEMUX may output data traffic on DTCH, which may also be provided to BCCH. The DEMUX may output control information along parallel DCCHs, e.g., DCCH1 and DCCH2.

The DCCHs may be coupled through ARQ, reassembly, security, and integrity modules for further L2 processing of control information prior to being provided to RRC layers 316 or 326 on SRBs, e.g., SRB1 and SRB2.

Figure 7:
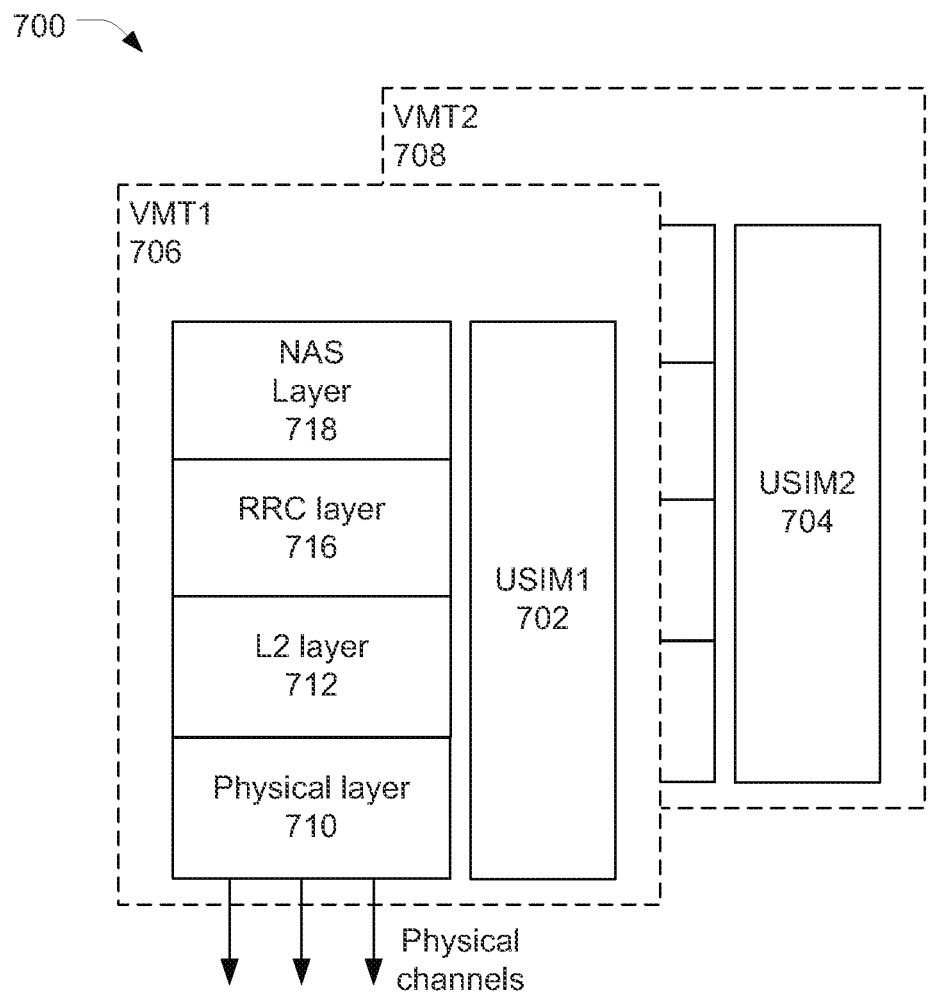
FIG. 7 illustrates a dual subscriber identity module, single active (DSSA) architecture in accordance with some embodiments.

FIG. 7 illustrates a high-level terminal architecture 700 of a UE, e.g., UE 200, in accordance with some embodiments. The terminal architecture 700 may utilize separate USIMs, e.g., USIM1 702 and USIM2 704, similar to terminal architecture 300. However, terminal architecture 700 may only have one active connection at one time. The terminal architecture 700 may be referred to as a dual SIM, single active (DSSA) architecture 700.

In the DSSA architecture 700, each VMT, e.g., VMT1 706 and VMT2 708, may have its own communication protocol stack. For example, VMT1 706 may include communication protocol stack having physical layer 710, L2 layer 712, RRC layer 716, and NAS layer 718. The layers of the communication protocol stack may operate similar to those described above with respect to FIG. 3. Though not shown, VMT2 708 may include a similar communication protocol stack as VMT1 706.

Each VMT will alternately have access to, e.g., control of, the radio transceiver. A connection of the VMT having access to the radio transceiver may be active, while the connection of the VMT not having access to the radio transceiver may be idle. The controlling VMT may be switched rapidly enough that a user of the UE 106 may not perceive the time-duplexing of the VMTs. For example, in some embodiments, the granularity of the switch time may be in the order of LTE subframes, e.g., a few milliseconds.

Switching of the VMTs may be facilitated by, e.g., using discontinuous reception (DRx) patterns. DRx patterns may be employed by the RAN and the VMTs to facilitate a determination of when network traffic is going to be directed to a given VMT. This information may be communicated in periodic polling intervals, in slot headers, etc.

Figure 4:
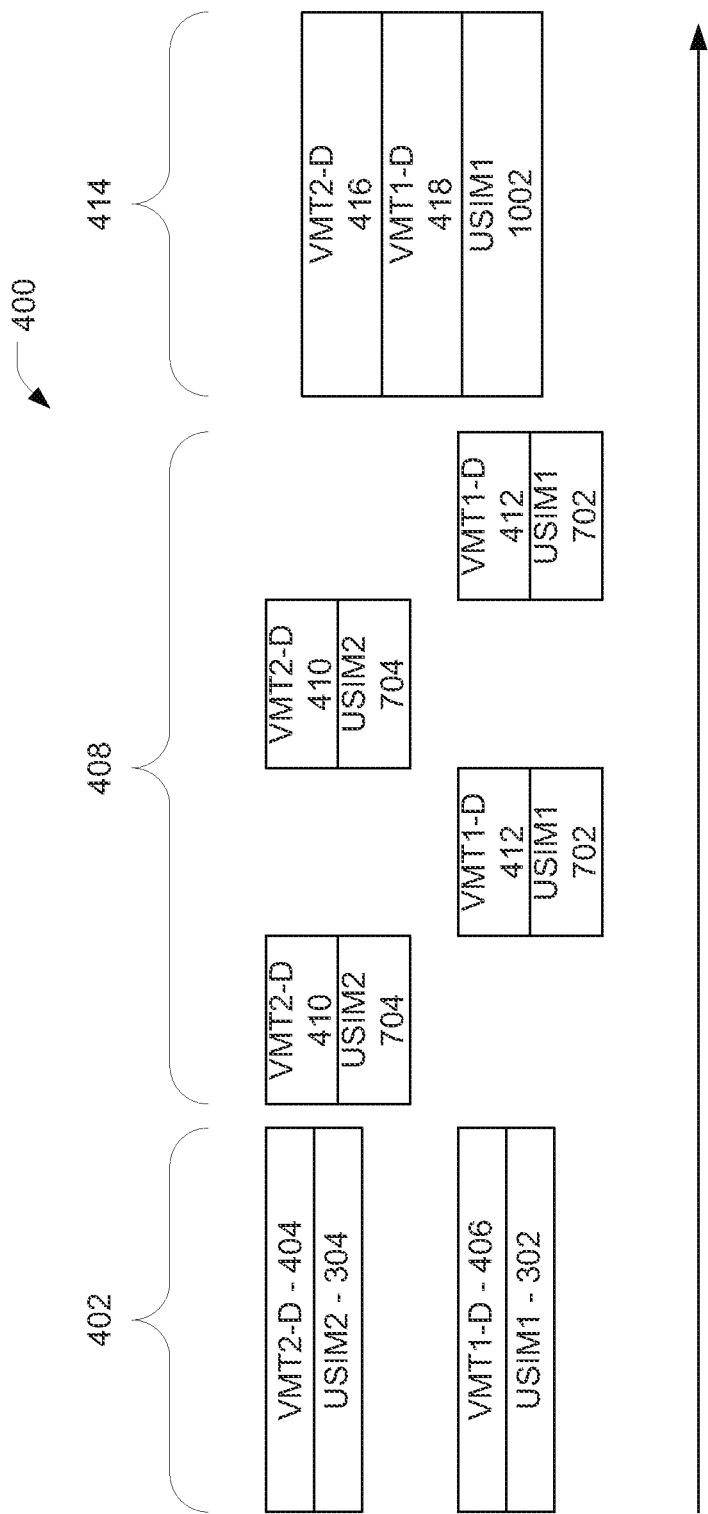
FIG. 4 illustrates various transmission sequences in accordance with some embodiments.

Sequential activation of the connections of the DSSA architecture 700 may be seen in DSSA activation sequence 408 of FIG. 4. The DSSA transmission sequence 408, which may result from a time-divisional multiplexing activation sequence, may result in VMT2-D 410, associated with USIM2 704, being transmitted in alternating sequence with VMT1-D 412, associated with USIM1 702.

Figure 8:
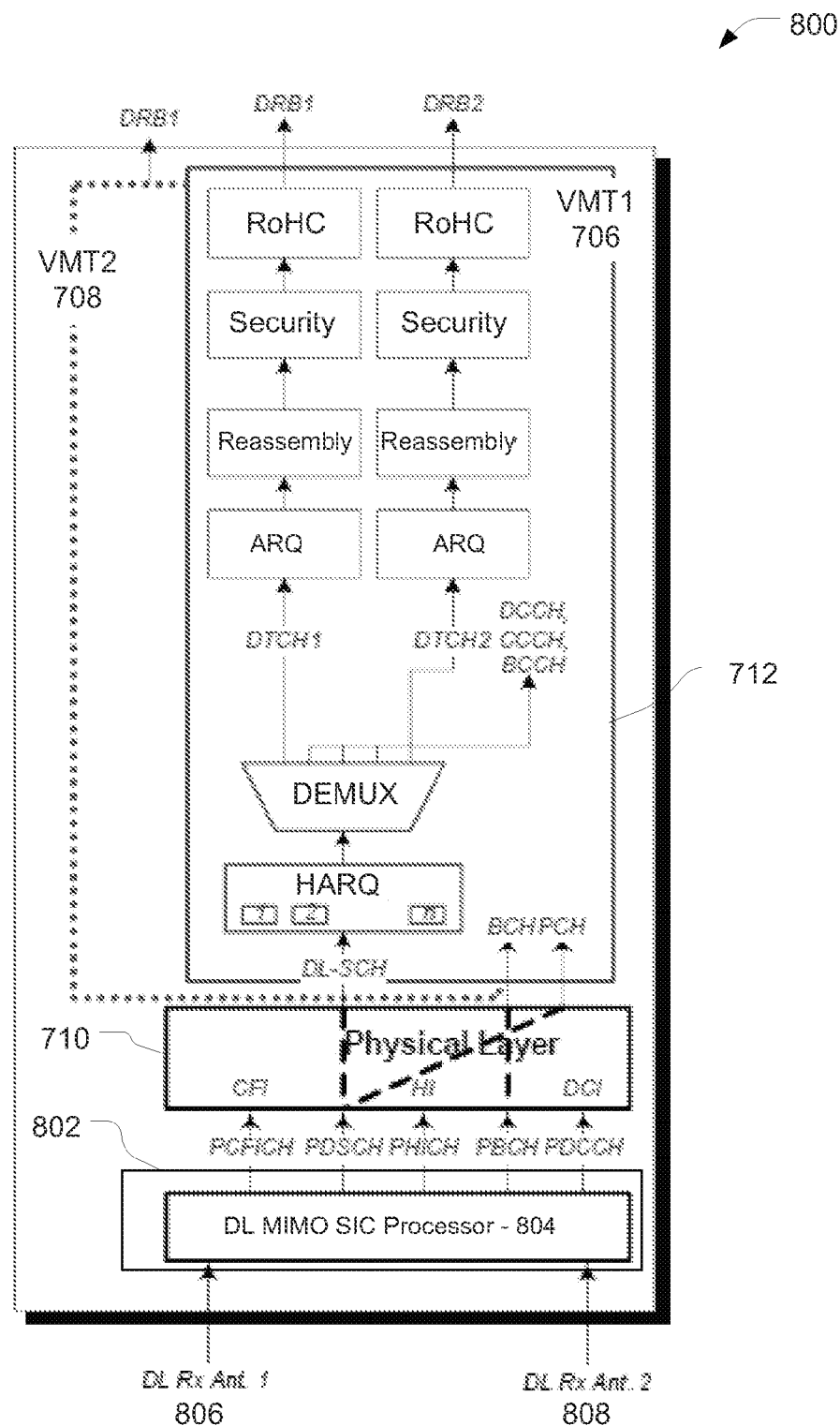
FIG. 8 illustrates a user data plane of a DSSA architecture in accordance with some embodiments.

FIG. 8 illustrates a user data plane 800 of DSSA architecture 700 in accordance with some embodiments. A radio transceiver 802, which may be similar to and substantially interchangeable with radio transceiver 204, may include a DL MIMO SIC processor 804 that is coupled with DL Rx Ant. 1 806 and DL Rx Ant. 2 808.

The DL MIMO SIC processor 804 may provide one set of data channels to the physical layer 710. The set of channels may include a PDCCH to provide DCI to the physical layer 710, a PBCH mapped to a BCH of an active L2 layer, e.g., L2 layer 712, a PHICH to provide an HI to the physical layer 710, a PDSCH mapped to a PCH and a DL-SCH of active L2 layer, and/or a PCFICH to provide a CFI to the physical layer 710.

Each of L2 layers of the DSSA architecture 700 may include a number of modules to provide various L2 functions and a number of channels through which data may be transported. For example, the DL-SCH may be provided to a HARQ module, which provides data to a DEMUX. The DEMUX may output control information along DCCH, CCCH, and/or broadcast control BCCH, and may output data traffic along parallel DTCHs, e.g., DTCH1 and DTCH2.

The DTCHs may be coupled through ARQ, reassembly, security, and RoHC modules for further L2 processing of data prior to being provided to an upper layer along DRBs, e.g., DRB1 and DRB2.

Figure 9:
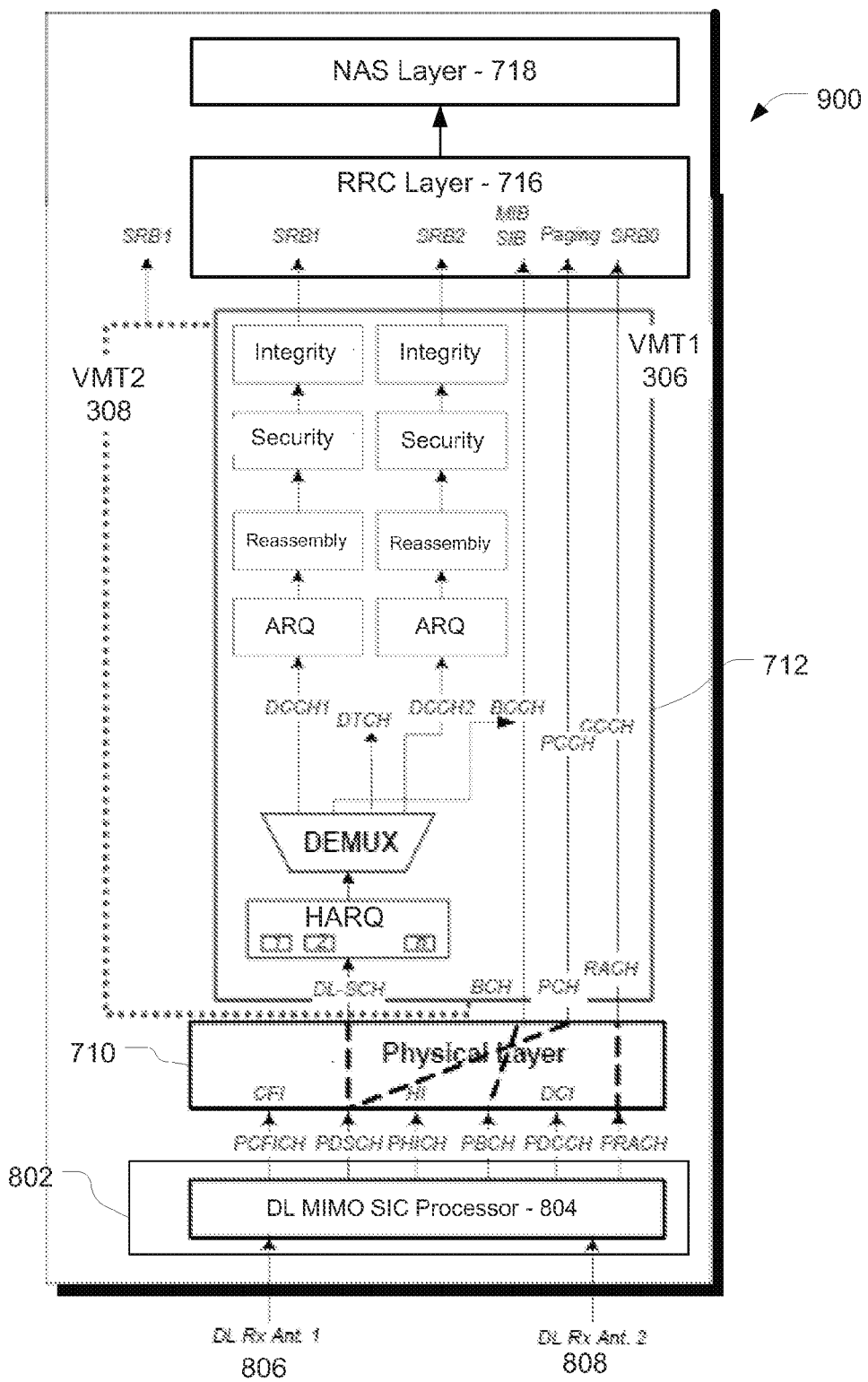
FIG. 9 illustrates a control plane of a DSSA architecture in accordance with some embodiments.

FIG. 9 illustrates a control plane 900 of DSSA architecture 700 in accordance with some embodiments. As in discussion of FIG. 8, the DL MIMO SIC processor 804 may be coupled with DL Rx Ant. 1 806 and DL Rx Ant. 2 808.

The DL MIMO SIC processor 804 may provide a set of control channels to the physical layer 710. The control channels may include a PRACH mapped to a RACH/CCCH of active L2 layer, e.g., L2 layer 712, a PDCCH to provide DCI to the physical layer 710, a PBCH mapped to a BCH of active L2 layer, a PHICH to provide HI to the physical layer 710, a PDSCH mapped to a PCH and a DL-SCH of active L2 layer, and/or a PCFICH to provide a CFI to the physical layer 710.

Information on the BCCH, PCCH, and CCCH may generally pass through the active L2 layer and be provided to an upper layer, e.g., RRC layer 716, on SRB0, Paging, and MIB/SIB, respectively. The information on the DL-SCH may be provided to HARQ module, which provides data to the DEMUX. The DEMUX may output data traffic on DTCH, which may also be provided to BCCH. The DEMUX may output control information along parallel DCCHs, e.g., DCCH1 and DCCH2.

The DCCHs may be coupled through ARQ, reassembly, security, and integrity modules for further L2 processing of control information prior to being provided to an upper layer, e.g., RRC layer 716, on SRBs, e.g., SRB1 and SRB2.

Figure 10:
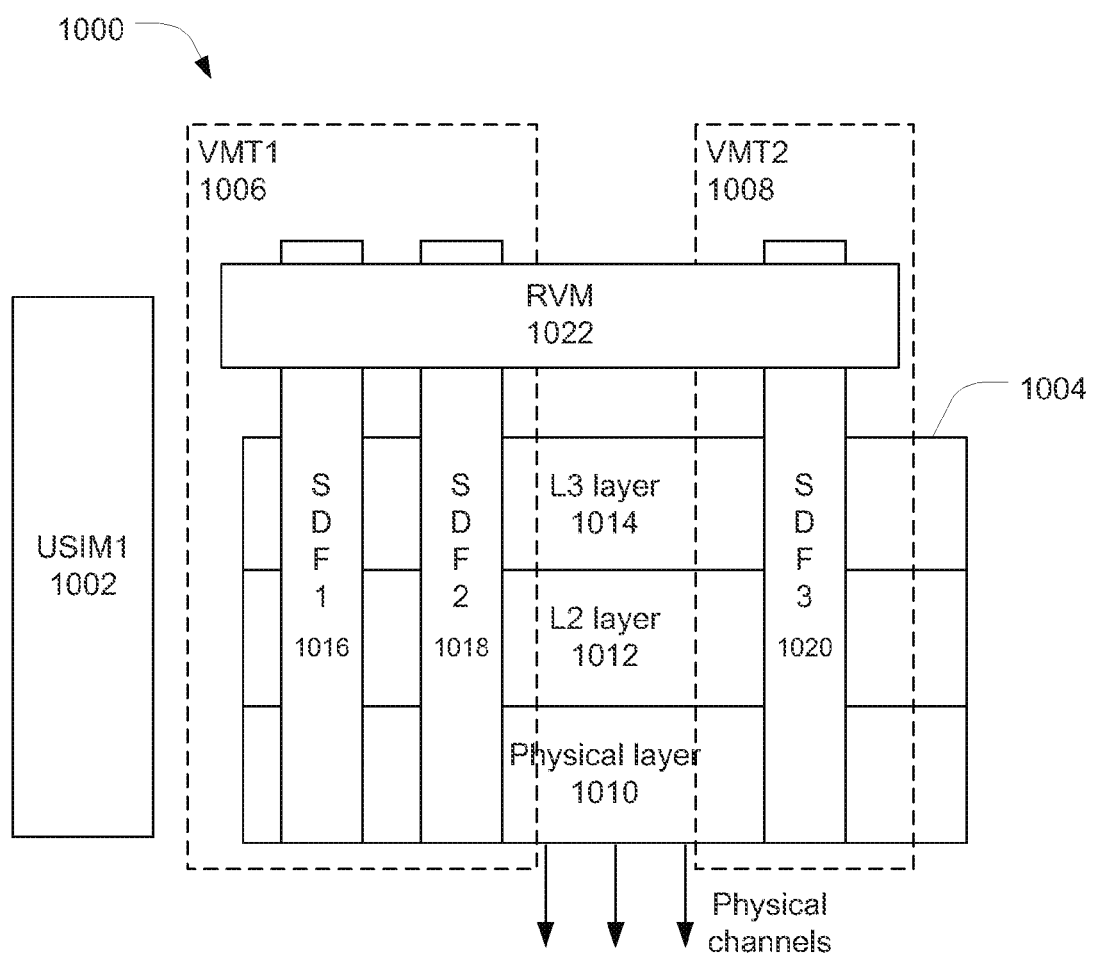
FIG. 10 illustrates a single subscriber identity module, dual active (SSDA) architecture in accordance with some embodiments.

FIG. 10 illustrates a high-level terminal architecture 1000 of an MT, e.g., MT 200, in accordance with some embodiments. The terminal architecture 1000 may utilize only one USIM, e.g., USIM1 1002, associated with dual active connections. Individual subscription profiles may be programmed into the USIM1 1002 for the different personas. The terminal architecture 1000 may be referred to as single-SIM, dual active (SSDA) architecture 1000.

The SSDA architecture 1000 may include one communication protocol stack, e.g., stack 1004, that is shared by the VMTs, e.g., VMT1 1006 and VMT2 1008. Stack 1004 is shown with physical layer 1010, L2 layer 1012, and L3 layer 1014, which may include a NAS layer and an RRC layer.

The terminal architecture 700 may provide dual active connections for VMT1 1006 and VMT2 1008 by using a number of service data flows (SDFs), e.g., SDF1 1016, SDF2 1018, and SDF3 1020. The VMT1 1006 may include a first set of the SDFs, e.g., SDF1 1016 and SDF2 1018, while the VMT2 1008 may include a second set of SDFs, e.g., SDF3 1020. In various embodiments, the VMTs may include any number of SDFs.

An SDF abstracts end-to-end IP data traffic for specific source and destination IP addresses and port numbers. An SDF may be mapped to a distinct evolved packet system (EPS) bearer that is associated with a respective VMT. For example, SDF1 1016 and SDF2 1018 may be mapped to a first EPS bearer that is associated with VMT1 1006 and a first set of profiles; while SDF3 1020 is mapped to a second EPS bearer that is associated with VMT2 1008 and a second set of profiles. Establishing different EPS bearers may, therefore, facilitate separate radio personas with, e.g., different access services and QoS profiles maintained for each persona.

The SSDA architecture 1000 may include a radio virtualization module (RVM) 1022 that establishes and manages the logical mapping between the service data flows and the VMTs/EPS bearers. The RVM 1022 may have both user plane and control plane functionalities. In the user plane, the RVM 1022 may be located above the L2 layer. In the control plane, the RVM 1022 may be either part of the RRC layer or a separate module on top of the RRC layer.

In addition to establishing and managing the logical mapping between the SDFs and the VMTs/EPS bearers, the RVM 1022 may enforce service and QoS profile for each VMT, participate in QoS management, billing and charging functions of the VMTs, consolidate control/management functions to/from different VMTs and resolve potential conflicts. The RVM 1022 may be a software module implement in the MT, or it may be implemented as part of a device driver running on terminal equipment.

Simultaneous activation of the connections of the SSDA architecture 1000 may be seen in SSDA transmission sequence 414 of FIG. 4. The SSSA transmission sequence 414 illustrates that both VMT2-D 416 and VMT1-D 418 are associated with USIM1 1002 and may be transmitted at the same time.

Figure 11:
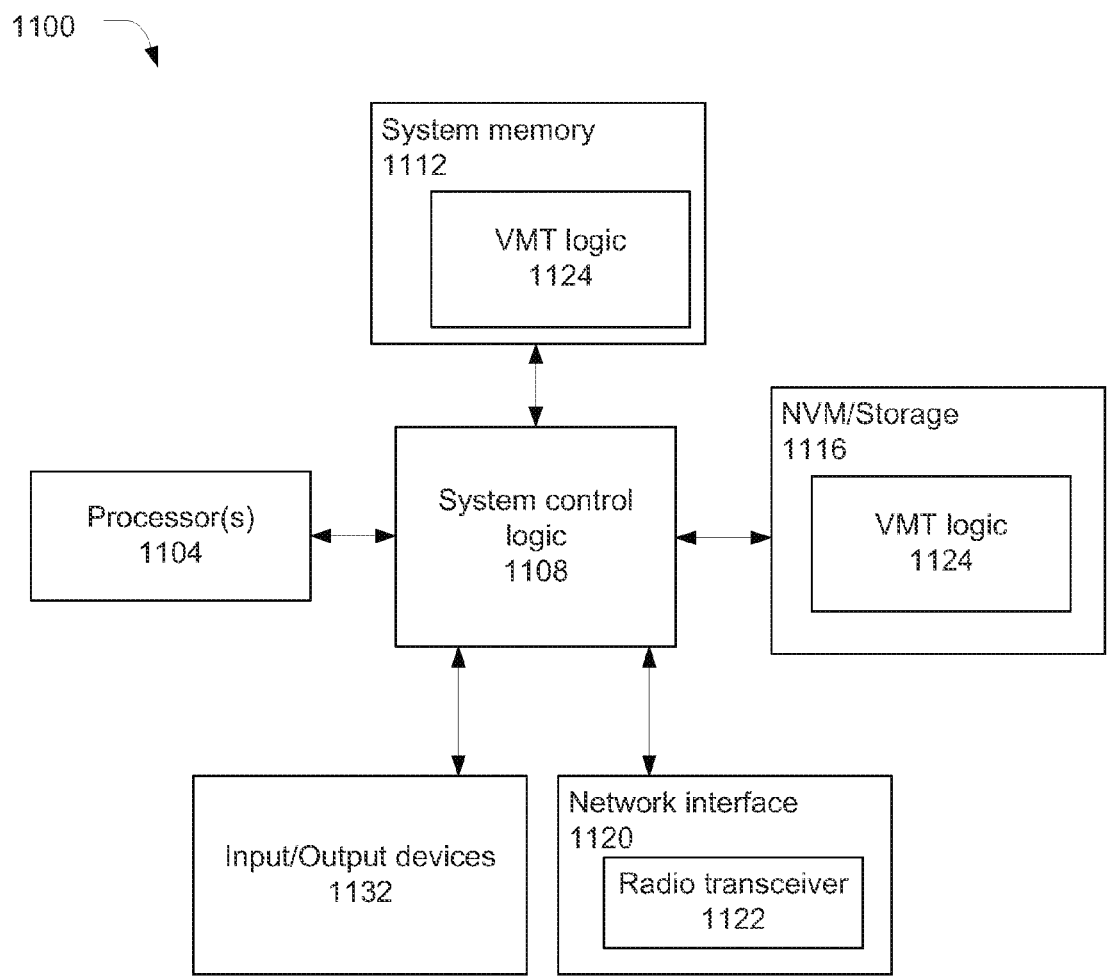
FIG. 11 illustrates a system that may be used to practice various embodiments described herein.

The virtual mobile terminals described herein may be implemented into a system using any suitable hardware and/or software to configure as desired. FIG. 11 illustrates, for one embodiment, an example system 1100 comprising one or more processor(s) 1104, system control logic 1108 coupled to at least one of the processor(s) 1104, system memory 1112 coupled to system control logic 1108, non-volatile memory (NVM)/storage 1116 coupled to system control logic 1108, and a network interface 1120 coupled to system control logic 1108. In various embodiments, the system 1100 may be the UE 106 and/or UE 200.

The one or more processor(s) 1104 may include one or more single-core or multi-core processors. The one or more processor(s) 1104 may include any combination of general-purpose processors and dedicated processors (e.g., graphics processors, application processors, etc.). The one or more processors 1104 may include, e.g., TE processors 216 and/or MT processors 210.

System control logic 1108 for one embodiment may include any suitable interface controllers to provide for any suitable interface to at least one of the processor(s) 1104 and/or to any suitable device or component in communication with system control logic 1108.

System control logic 1108 for one embodiment may include one or more memory controller(s) to provide an interface to system memory 1112. System memory 1112 may be used to load and store data and/or instructions, for example, for system 1100. System memory 1112 for one embodiment may include any suitable volatile memory, such as suitable dynamic random access memory (DRAM), for example.

NVM/storage 1116 may include one or more tangible, non-transitory computer-readable media used to store data and/or instructions, for example. NVM/storage 1116 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1116 may include a storage resource physically part of a device on which the system 1100 is installed or it may be accessible by, but not necessarily a part of, the device. For example, the NVM/storage 1116 may be accessed over a network via the network interface 1120.

System memory 1112 and NVM/storage 1116 may include, in particular, temporal and persistent copies of VMT logic 1124, respectively. The VMT logic 1124 may include instructions that when executed by at least one of the processor(s) 1104 result in the system 1100 performing VMT operations described herein. In some embodiments, the VMT logic 1124, or hardware, firmware, and/or software components thereof, may additionally/alternatively be located in the system control logic 1108, the network interface 1120, and/or the processor(s) 1104.

Network interface 1120 may have a radio transceiver 1122 to provide a radio interface for system 1100 to communicate over one or more network(s) and/or with any other suitable device. The radio transceiver 1122 may be similar to, and substantially interchangeable with, radio transceiver 502 and/or radio transceiver 802. Network interface 1120 may include any suitable hardware and/or firmware. Network interface 1120 may include a plurality of antennas to provide a MIMO radio interface. Network interface 1120 for one embodiment may include, for example, a network adapter, a wireless network adapter, a telephone modem, and/or a wireless modem.

For one embodiment, at least one of the processor(s) 1104 may be packaged together with logic for one or more controller(s) of system control logic 1108. For one embodiment, at least one of the processor(s) 1104 may be packaged together with logic for one or more controllers of system control logic 1108 to form a System in Package (SiP). For one embodiment, at least one of the processor(s) 1104 may be integrated on the same die with logic for one or more controller(s) of system control logic 1108. For one embodiment, at least one of the processor(s) 1104 may be integrated on the same die with logic for one or more controller(s) of system control logic 1108 to form a System on Chip (SoC).

The system 1100 may further include input/output (I/O) devices 1132. The I/O devices 1132 may include user interfaces designed to enable user interaction with the system 1100, peripheral component interfaces designed to enable peripheral component interaction with the system 1100, and/or sensors designed to determine environmental conditions and/or location information related to the system 1100.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 1120 to communicate with components of a positioning network, e.g., a global positioning system (GPS) satellite.

In various embodiments, the system 1100 may be a mobile computing device such as, but not limited to, a laptop computing device, a tablet computing device, a netbook, a smartphone, etc. In various embodiments, system 1100 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A user equipment comprising:
a radio transceiver to communicatively couple the user equipment to a radio access network;
a first virtual mobile terminal to establish a first connection with the radio access network via the radio transceiver;
a second virtual mobile terminal to establish a second connection with the radio access network via the radio transceiver, wherein the first connection is active concurrent with the second connection to enable transmission or reception of first data via the first connection simultaneously with transmission or reception of second data via the second connection,
wherein:
the first virtual mobile terminal is configured to use a first communication protocol stack including layer 2 and higher protocol layers including a first radio resource control (RRC) layer;
the second virtual mobile terminal is configured to use a second communication protocol stack including layer 2 and higher protocol layers including a second RRC layer; and
both the first virtual mobile and the second virtual mobile terminal are configured to use a common physical layer; and
a combined RRC layer to manage radio procedures of the radio access network for both the first and second virtual mobile terminals, the combined RRC layer to include state machines that are supersets of state machines of the first and second RRC layers.

2. The user equipment of claim 1, wherein:
the first virtual mobile terminal is to establish the first connection with a first set of profiles including a first subscription profile, a first quality of service (QoS) profile, and a first billing profile; and
the second virtual mobile terminal is to establish the second connection with a second set of profiles including a second subscription profile, a second QoS profile, and a second billing profile.

3. The user equipment of claim 1, further comprising:
a mobile terminal having one or more mobile terminal processors to provide the first and second virtual mobile terminals; and
terminal equipment having one or more terminal equipment processors to provide a first virtual machine and a second virtual machine, wherein the first virtual machine is communicatively coupled with the first virtual mobile terminal and the second virtual machine is communicatively coupled with the second virtual mobile terminal.

4. The user equipment of claim 1, further comprising:
a first universal subscriber identity module associated with the first virtual mobile terminal; and
a second universal subscriber identity module associated with the second virtual mobile terminal.

5. The user equipment of claim 1, wherein the first connection and the second connection are to be activated in a time-division multiplexing activation sequence.

6. A user equipment comprising:

one or more storage media having logic stored therein;

one or more processors to operate the logic to provide:

a first virtual mobile terminal to establish a first connection with a radio access network via a radio transceiver;

a second virtual mobile terminal to establish a second connection with the radio access network via the radio transceiver, wherein the first connection is to be established in a manner to be active concurrent with the second connection to enable transmission or reception of first data via the first connection simultaneously with transmission or reception of second data via the second connection, wherein:

the first virtual mobile terminal is to use a first communication protocol stack including layer 2 and higher protocol layers including a first radio resource control (RRC) layer;

the second virtual mobile terminal is to use a second communication protocol stack including layer 2 and higher protocol layers including a second RRC layer; and both the first virtual mobile and the second virtual mobile terminal are to use a common physical layer; and a combined RRC layer to manage radio procedures of the radio access network for both the first and second virtual mobile terminals, the combined RRC layer to include state machines that are supersets of state machines of the first and second RRC layers.

7. The user equipment of claim 6, wherein:

the first virtual mobile terminal is to establish the first connection with a first set of profiles including a first subscription profile, a first quality of service (QoS) profile, and a first billing profile; and the second virtual mobile terminal is to establish the second connection with a second set of profiles including a second subscription profile, a second QoS profile, and a second billing profile.

8. The user equipment of claim 6, further comprising:

a first universal subscriber identity module associated with the first virtual mobile terminal; and a second universal subscriber identity module associated with the second virtual mobile terminal.

* * * * *